United States Patent
Maier et al.

(10) Patent No.: US 11,489,384 B2
(45) Date of Patent: Nov. 1, 2022

(54) EC MOTOR WITH CAST ARMATURE SHAFT

(71) Applicant: C. & E. Fein GmbH, Schwaebisch Gmuend-Bargau (DE)

(72) Inventors: Christoph Maier, Notzingen (DE); Fabian Grass, Stuttgart (DE); Thomas Burkhardt, Heubach (DE)

(73) Assignee: C&E Fein GmbH, Schwaebisch Gmuend-Bargau (DE)

( * ) Notice: Subject to any disclaimer, the term of this patent is extended or adjusted under 35 U.S.C. 154(b) by 0 days.

(21) Appl. No.: 17/308,130

(22) Filed: May 5, 2021

(65) Prior Publication Data
US 2021/0328469 A1 Oct. 21, 2021

Related U.S. Application Data

(62) Division of application No. 16/184,505, filed on Nov. 8, 2018, now Pat. No. 11,114,910.

(30) Foreign Application Priority Data

Nov. 8, 2017 (DE) .................. 10 2017 126 143.5

(51) Int. Cl.
*H02K 15/00* (2006.01)
*H02K 1/28* (2006.01)
(Continued)

(52) U.S. Cl.
CPC .............. *H02K 1/28* (2013.01); *H02K 1/276* (2013.01); *H02K 1/30* (2013.01); *H02K 7/04* (2013.01);
(Continued)

(58) Field of Classification Search
CPC ........ H02K 1/02; H02K 1/2793; H02K 3/493; H02K 7/04; H02K 7/083; H02K 21/14;
(Continued)

(56) References Cited

U.S. PATENT DOCUMENTS 4,933,583 A * 6/1990 Ripplinger ............ F16F 15/322
310/216.116
4,973,872 A * 11/1990 Dohogne ............... H02K 1/278
310/156.28
(Continued)

FOREIGN PATENT DOCUMENTS

DE 10 2010 031 399 A1 1/2012
DE 10 2010 061 778 A1 5/2012
(Continued)

*Primary Examiner* — Thiem D Phan
(74) *Attorney, Agent, or Firm* — Muncy, Geissler, Olds & Lowe, P.C.

(57) ABSTRACT

An EC motor is provided having a stator, in which an armature is rotatably supported, the armature including an armature shaft, on which an armature core having a plurality of permanent magnets is held, the armature core being electrically insulated against the armature shaft with the aid of a casting compound, and a balance ring being provided on at least one axial end of the armature core, which is accommodated on the armature shaft by a central recess, a gap between the armature shaft and the central recess of the balance ring being filled with casting compound, and the permanent magnets being held in pockets of the armature core by casting compound.

11 Claims, 4 Drawing Sheets

(51) Int. Cl.
*H02K 1/30* (2006.01)
*H02K 1/276* (2022.01)
*H02K 7/04* (2006.01)
*H02K 15/03* (2006.01)
*H02K 15/12* (2006.01)
*H02K 15/16* (2006.01)
*H02K 21/14* (2006.01)

(52) U.S. Cl.
CPC ............. *H02K 15/03* (2013.01); *H02K 15/12* (2013.01); *H02K 15/165* (2013.01); *H02K 21/14* (2013.01); *Y10T 29/49012* (2015.01); *Y10T 29/53143* (2015.01)

(58) Field of Classification Search
CPC ........ H02K 15/16; H02K 15/02; H02K 15/03; H02K 15/165; H02K 1/27; Y10T 29/49009; Y10T 29/49012; Y10T 29/53143; F16C 2380/26
USPC ...... 29/732, 598, 527.1, 596, 605, 606, 607, 29/609, 729, 738, 820
See application file for complete search history.

(56) References Cited

U.S. PATENT DOCUMENTS

| | | | |
|---|---|---|---|
| 7,814,641 | B2 | 10/2010 | Du et al. |
| 8,975,800 | B2 | 3/2015 | Riedl et al. |
| 10,128,703 | B2 | 11/2018 | Jin et al. |
| 2006/0022541 | A1 | 2/2006 | Ong et al. |
| 2015/0357871 | A1 | 12/2015 | Kim et al. |
| 2017/0033626 | A1 | 2/2017 | Hartmann et al. |

FOREIGN PATENT DOCUMENTS

| | | | |
|---|---|---|---|
| DE | 10 2015 110 267 A1 | 12/2016 | |
| EP | 2 930 825 A1 | 10/2015 | |
| EP | 2 955 817 A1 | 12/2015 | |
| WO | WO2016207023 | * 12/2016 | ............. H02K 15/12 |

* cited by examiner

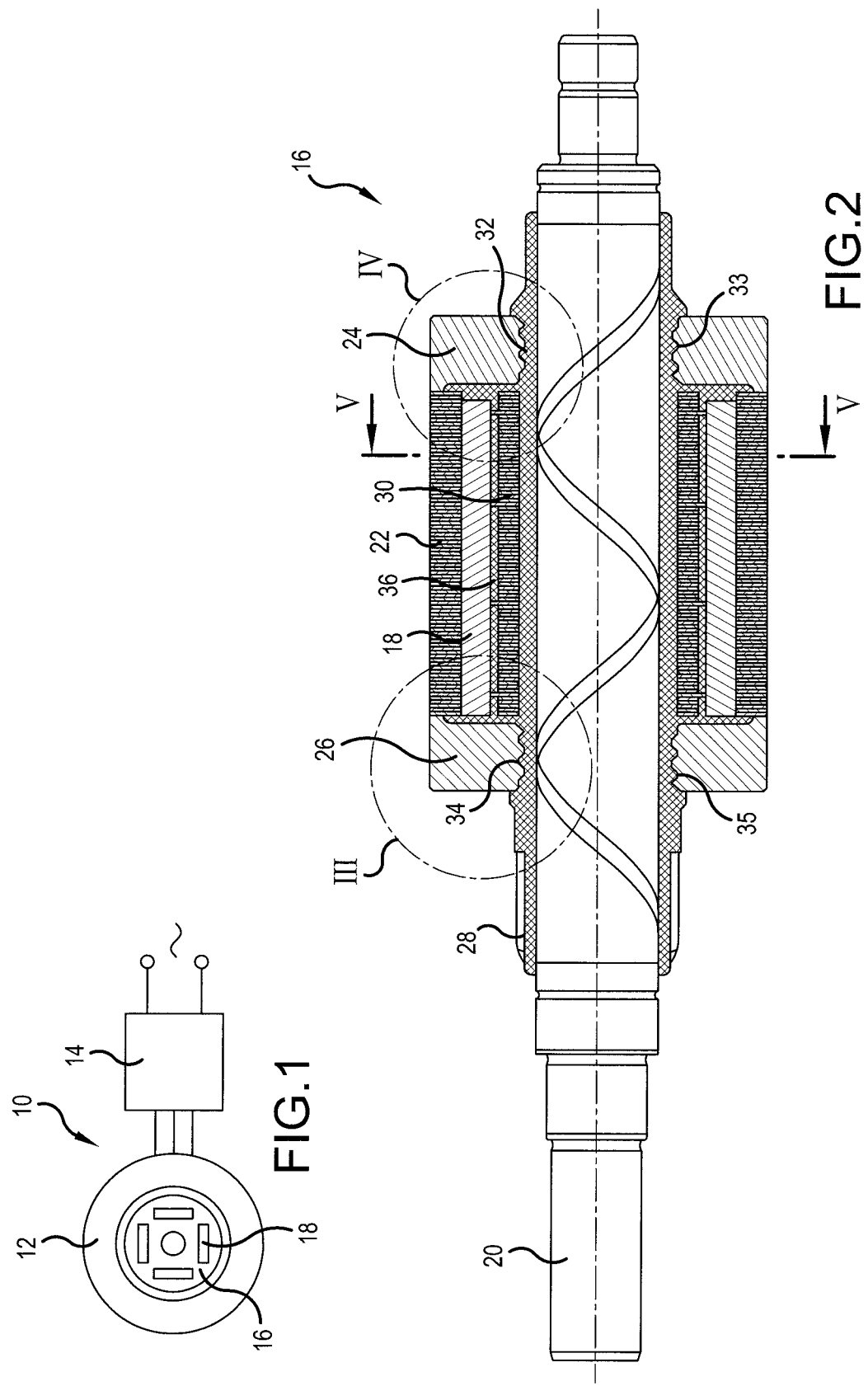

EC MOTOR WITH CAST ARMATURE SHAFT

This nonprovisional application is a Divisional Application of U.S. application Ser. No. 16/184,505, which was filed on Nov. 8, 2018, and claims priority under 35 U.S.C. § 119(a) to German Patent Application No. 10 2017 126 143.5, which was filed in Germany on Nov. 8, 2017, and which is herein incorporated by reference.

BACKGROUND OF THE INVENTION

Field of the Invention

The present invention relates to an EC motor, comprising a stator in which an armature is rotatably supported, the armature including an armature shaft, on which an armature core having a plurality of permanent magnets is held, the armature core being electrically insulated against the armature shaft with the aid of a casting compound.

Description of the Background Art

An EC motor of this type is known, for example from DE 10 2010 031 399 A1, which corresponds to U.S. Pat. No. 8,975,800. The armature core is fixed on the armature shaft with the aid of a transfer molding process.

EC motors (brushless, electronically commutated electric motors) are used, for example, in hand-guided or portable electric power tools. They are made up of a stator having multiple windings and an armature (also referred to as a rotor) fitted with permanent magnets. A rotating field, which drives the rotor, is generated in the stator by a suitable activation. If motors of this type are to be used in mains-operated electric power tools, it is necessary to implement an electrical insulation between the armature shaft and the armature core.

In the EC motor according to the aforementioned DE 10 2010 031 399 A1, this is accomplished by introducing a suitable plastic by means of injection molding. The inner contour of the armature core is specially formed to ensure a good torque transmission from the armature core via the casting compound to the armature shaft, which is made from steel. Cavities may be provided in the pockets provided in the armature core for accommodating permanent magnets to permit an introduction of casting compound.

The disadvantage of the known EC motor is that the casting compound must be brought from the center of the armature core to the openings for the permanent magnets in a complex process with the aid of the injection molding die.

SUMMARY OF THE INVENTION

It is therefore an object of the present invention to provide an EC motor having an improved armature shaft, which is easy, safe, and cost-effective to manufacture.

In addition, a suitable manufacturing method is to be specified for an easy, cost-effective and safe manufacture of an armature for an EC motor.

With regard to the EC motor according to the type mentioned at the outset, this object is achieved in an exemplary embodiment in that a balance ring is provided on at least one axial end of the armature core, which is accommodated on the armature shaft via a central recess, a gap between the armature shaft and the central recess being filled with casting compound, and the permanent magnets being held in pockets of the armature core by casting compound.

The object of the invention is also achieved by a method for manufacturing an armature for an EC motor, including, for example, the steps: providing an armature shaft; providing an armature core having pockets for accommodating permanent magnets; providing a balance ring on at least one axial end of the armature core; fixing the permanent magnets in the pockets of the armature core; placing the balance ring on the end of the armature core; inserting the armature shaft, the armature core and the at least one balance ring into a casting mold, centered relative to each other, in such a way that the balance ring abuts the axial end of the armature core; closing the casting mold; supplying casting compound under pressure into a gap between the armature core and the pockets with the permanent magnets via a sprue in the form of a gap between the balance ring and the armature shaft; curing the casting compound; and removing the armature from the mold.

The gap between the central recess of the balance ring can be used as a sprue to supply casting compound into the gap between the armature shaft and the armature core and into the pockets of the armature core. This results in an easy supply of the casting compound. A separate fastening of the permanent magnets by means of complex gluing also becomes superfluous. A significantly simplified and cost-effective manufacture thus results. The balance rings, which are necessary in any case to facilitate a balancing of the armature and which are usually pressed onto the armature shaft according to the prior art, can now be connected to the armature shaft in the casting operation.

The central recess of the balance ring can be designed as a sprue in the form of a gap for introducing casting compound into a gap between the armature core and the armature shaft and into the pockets of the armature core.

Balance rings having central recesses can be provided on both ends of the armature core, which are designed as sprues for introducing casting compound into the gap between the armature core and the armature shaft and into the pockets of the armature core.

The supply of casting compound can be further facilitated in this manner. A uniform distribution of casting compound from at least one side is also made possible.

The outer diameter of each balance ring can correspond to the outer diameter of the armature core.

An easy sealing within the injection molding die during the injection of the casting compound is facilitated in this manner.

Each or at least one sealing ring can be closed in the direction of the armature core by an annular projection on its side facing the armature core. The annular projection can be designed to be flush with the outer surface of the balance ring.

In this way, a better sealing against the armature core during an injection molding operation may be ensured by the annular projection.

Each or at least one balance ring can be provided with form-fitting elements, preferably in the form of seams or groves, at its central recess.

In this way, the connection between the casting compound and the balance ring is provided with a form-fitting design, which contributes to stability.

Each or at least one permanent magnet can be fixed in its pocket by protruding noses of lamination elements of the armature core, at least two, preferably four, laminations having a nose.

By fixing the permanent magnets in their pockets in this manner, a fixing of the permanent magnets in their assigned pockets may be ensured prior to casting the armature. This makes the manufacturing operation easier.

Each or at least one balance ring can be made from a brass alloy or a comparable, non-magnetic material, while the armature shaft is preferably made from steel.

This permits an easy balancing.

Balance rings can be placed on the armature core at both axial ends of the armature core, and the casting compound is supplied from both sides via sprues in the form of gaps between the balance rings and the armature shaft.

This facilitates the casting process and results in a more uniform distribution of the casting compound.

Each or at least one balance ring can be sealed against the armature core by an annular projection on its side facing the armature core, the annular projection being preferably designed to be flush with the outer surface of the balance ring.

This facilitates the sealing of the balance ring against the armature core during the casting operation.

Each or at least one balance ring can be provided with form-fitting elements, for example, in the form of seams or groves, at its central recess.

This facilitates a form-fitting connection between the balance ring and the casting compound after the latter is cured.

Each or at least one permanent magnet can be fixed in its pocket by protruding noses of laminations of the armature core before the fixing by the casting compound takes place.

A fixing in the radial direction is ensured in this manner during the injection molding operation.

A securing of the permanent magnets against a displacement in the axial direction may be furthermore ensured, at least on one end, during the injection molding operation by a stop against an annular projection of a balance ring.

These measures make manufacturing easier.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a greatly simplified representation of an EC motor according to the invention;

FIG. 2 shows an enlarged longitudinal sectional view of the armature shaft of the EC motor according to FIG. 1;

DETAILED DESCRIPTION

Figure 3:
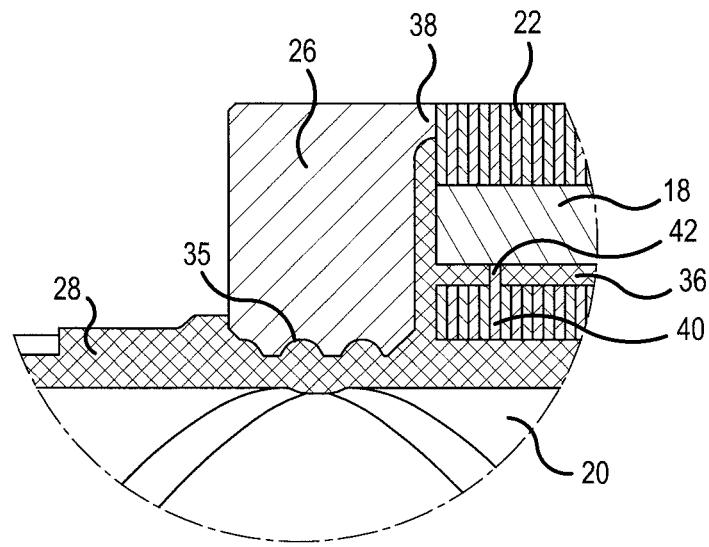
FIG. 3 shows an enlarged section of detail III according to FIG. 2.

FIG. 1 shows a simplified representation of an EC motor according to the invention.

Motor 10 comprises a stator 12, which has a plurality of stator windings. An armature 16 is rotatably supported within stator 12, which has a plurality of permanent magnets 18. Stator 12 is activated with the aid of an activator 14 having a rotating field, by means of which the rotation of armature 16 is generated.

FIG. 2 shows an enlarged longitudinal sectional view of an armature 16 according to the invention according to FIG. 1.

Armature 16 includes a motor shaft 20, which is lathed from tool steel. An armature core 22 is accommodated on armature shaft 20, in which four permanent magnets 18 are accommodated, tangentially to each other, at uniform angular distances from each other. Permanent magnets 18 are held in pockets 36 of armature core 22 and fixed with the aid of casting compound 28.

A balance ring 24, 26, which is made from brass or a comparable non-magnetic material, is provided on each of the two axial ends of armature core 22. Gaps 32, 34, which are filled with casting compound 28, are provided between balance rings 24, 26 and the outer surface of the motor shaft. Casting compound 28 also extends continuously into a gap 30 between armature core 22 and the outer surface of motor shaft 20 as well as into pockets 36, in which permanent magnets 18 are accommodated. Gap 32, 34 between balance rings 24, 26 are used to supply casting compound 28 to gap 30 between armature core 22 and armature shaft 20 as well as to pockets 36, in which permanent magnets 18 are accommodated, during an injection molding operation.

Figure 4:
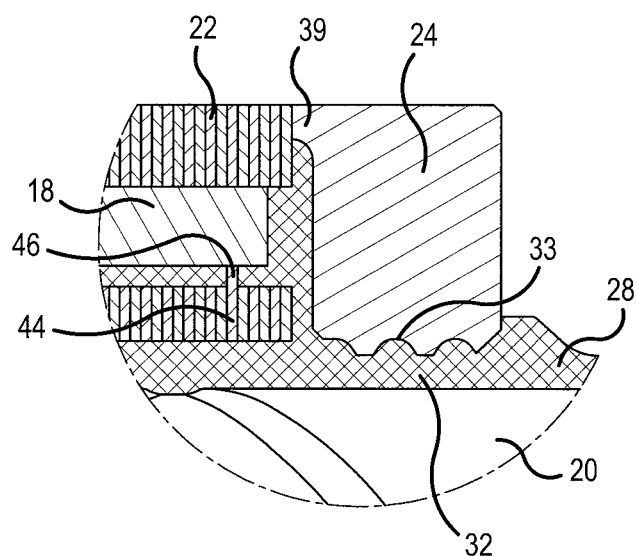
FIG. 4 shows an enlarged section of detail IV according to FIG. 2.

Balance rings 24, 26 are provided for balancing armature 16 later on after the casting of armature 16. As is apparent in greater detail from FIGS. 3 and 4, balance rings 24, 26 are provided with form-fitting elements 33, 35 at their central recesses, which are designed as seams, so that a form-fitting connection with casting compound 28 results after the casting compound is cured.

An annular projection 38, 39 is formed on each balance ring 24, 26 in the direction of armature core 22. The outer surface of balance rings 24, 26 and of annular projection 38, 39 is designed to be flush with the outer surface of armature core 22. Annular projections 38, 39 are used to seal balance rings 24, 26 against armature core 22 during the injection molding operation.

To facilitate a fixing of permanent magnets 18 within pockets 36 prior to the injection molding operation, multiple laminations 40, 44 are formed on armature core 22, each having a nose 42 and 46, respectively, which project into pockets 36. Permanent magnets 18 may be fixed in pockets 36 by noses 42, 44 prior to the injection molding operation.

Figure 6:
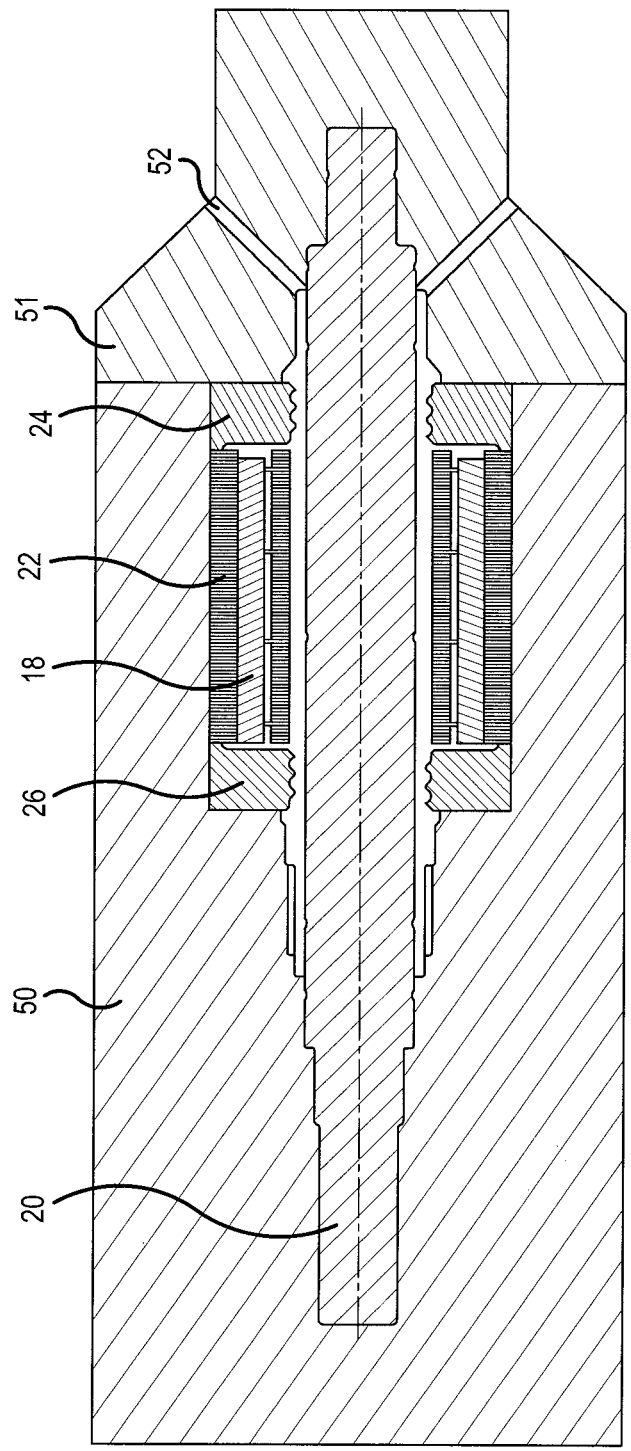
FIG. 6 shows a top view of one mold half of a casting mold, in which the armature, including its motor shaft, the armature core and the two balance rings, is inserted prior to supplying the casting compound, the motor shaft, the armature core and the balance rings being illustrated in a cutaway view.

FIG. 6 shows a sectional view of an injection mold 50, 51, into which armature shaft 20 is introduced, together with armature core 22 and the two balance rings 24, 26. Motor shaft 20, balance rings 24, 26 and armature core 22 are centered with respect to each other in mold 50, 51 by correspondingly shaped recesses. The second mold half 51 is pressed on prior to the injection molding operation, and casting compound is supplied via one or multiple sprues 52 through mold 51 into the cavity, which is formed between mold 50, 51, the outer surface of motor shaft 20, balance rings 24, 26 and armature core 22.

Casting compound 28 is distributed under pressure into the corresponding cavities, so that a cast armature 16 according to FIG. 2 results after casting compound 28 is cured.

Figure 5:
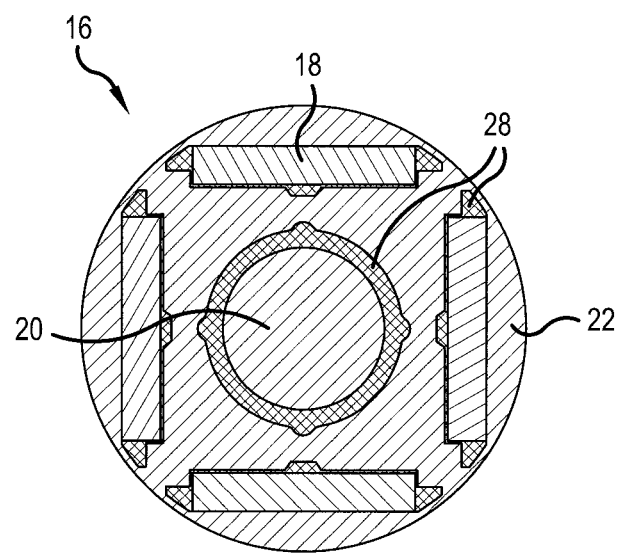
FIG. 5 shows a cross sectional view of the armature along line V-V according to FIG. 2.

FIG. 5 shows a cross sectional view of armature 16 along line V-V according to FIG. 2.

It is apparent that both armature core 22 and armature shaft 20 are provided with assigned form-fitting elements to ensure a form-fitting connection and thus a secure transmission of torque after casting compound 28 is cured.

Permanent magnets 18 are secured against an axial displacement during the injection molding operation by a stop against annular projection 38 of balance ring 26. The stop against annular projection 38 takes place in the edge area (cf. FIG. 5) of permanent magnets 18.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An EC motor comprising:
   a stator in which an armature is rotatably supported, the armature including an armature shaft on which an armature core having a plurality of permanent magnets is held, the armature core being electrically insulated against the armature shaft via a casting compound;
   a balance ring provided on at least one axial end of the armature core, which is accommodated on the armature shaft by a central recess,
   wherein the central recess of the balance ring forms a gap between the armature shaft and the balance ring, the gap being filled with the casting compound,
   wherein the permanent magnets are held in pockets of the armature core by the casting compound, and
   wherein the gap formed by the central recess of the balance ring is designed as a sprue for introducing the casting compound into a further gap, provided between the armature core and the armature shaft, as well as into the pockets of the armature core.

2. The EC motor according to claim 1, wherein the balance ring is provided on both ends of the armature core, such that two balance rings are provided which each have the gap designed as the sprue for introducing the casting compound into the further gap, provided between the armature core and the armature shaft as well as into the pockets of the armature core.

3. The EC motor according to claim 1, wherein an outer diameter of the balance ring corresponds to an outer diameter of the armature core.

4. The EC motor according to claim 1, wherein the balance ring is closed in a direction of the armature core by an annular projection on a side facing the armature core.

5. The EC motor according to claim 4, wherein the annular projection is flush with an outer surface of the balance ring.

6. The EC motor according to claim 4, wherein the annular projection axially supports the permanent magnets.

7. The EC motor according to claim 4, wherein the balance ring has an inner circumferential surface facing the armature shaft and an outer circumferential surface facing away from the armature shaft, wherein the annular projection projects toward the side of the balance ring facing the armature core at a position that is closer to the outer circumferential surface than the inner circumferential surface.

8. The EC motor according to claim 1, wherein the central recess of the balance ring is provided with form-fitting elements in the form of seams or grooves.

9. The EC motor according to claim 1, wherein the balance ring is made from a brass alloy or a comparable non-magnetic material, and wherein the armature shaft is made from steel.

10. The EC motor according claim 1, wherein, with respect to an axial direction of the armature shaft, a portion of the balance ring is spaced apart from the armature core and the pockets so as to form a spacing that is in fluid communication with the gap formed by the central recess of the balance ring to introduce the casting compound in the gap formed by the central recess of the balance ring into the pockets.

11. An EC motor comprising:
   a stator in which an armature is rotatably supported, the armature including an armature shaft on which an armature core having a plurality of permanent magnets is held, the armature core being electrically insulated against the armature shaft via a casting compound;
   a balance ring provided on at least one axial end of the armature core, which is accommodated on the armature shaft by a central recess,
   wherein the central recess of the balance ring forms a gap between the armature shaft and the balance ring, the gap being filled with the casting compound,
   wherein the permanent magnets are held in pockets of the armature core by the casting compound, and
   wherein at least one of the permanent magnets is fixed in a respective one of the pockets by a protruding nose of a lamination of the armature core, and wherein at least two or four laminations have the nose.

* * * * *